Figure 1:
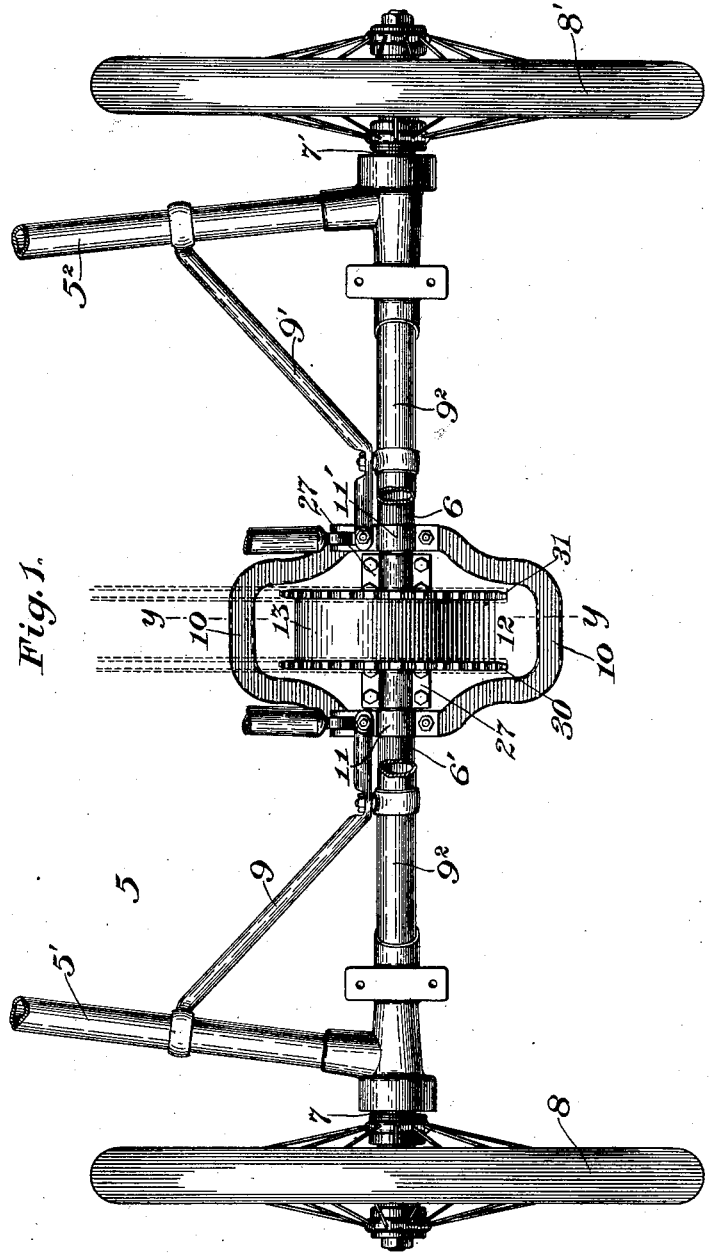

No. 685,321. Patented Oct. 29, 1901.
F. C. BILLINGS.
COMPENSATING GEAR.
(Application filed July 17, 1900.)

(No Model.) 2 Sheets—Sheet 1.

Witnesses:

Inventor:
Frederic C. Billings,
By his Attorney.

No. 685,321. Patented Oct. 29, 1901.
F. C. BILLINGS.
COMPENSATING GEAR.
(Application filed July 17, 1900.)
(No Model.) 2 Sheets—Sheet 2.
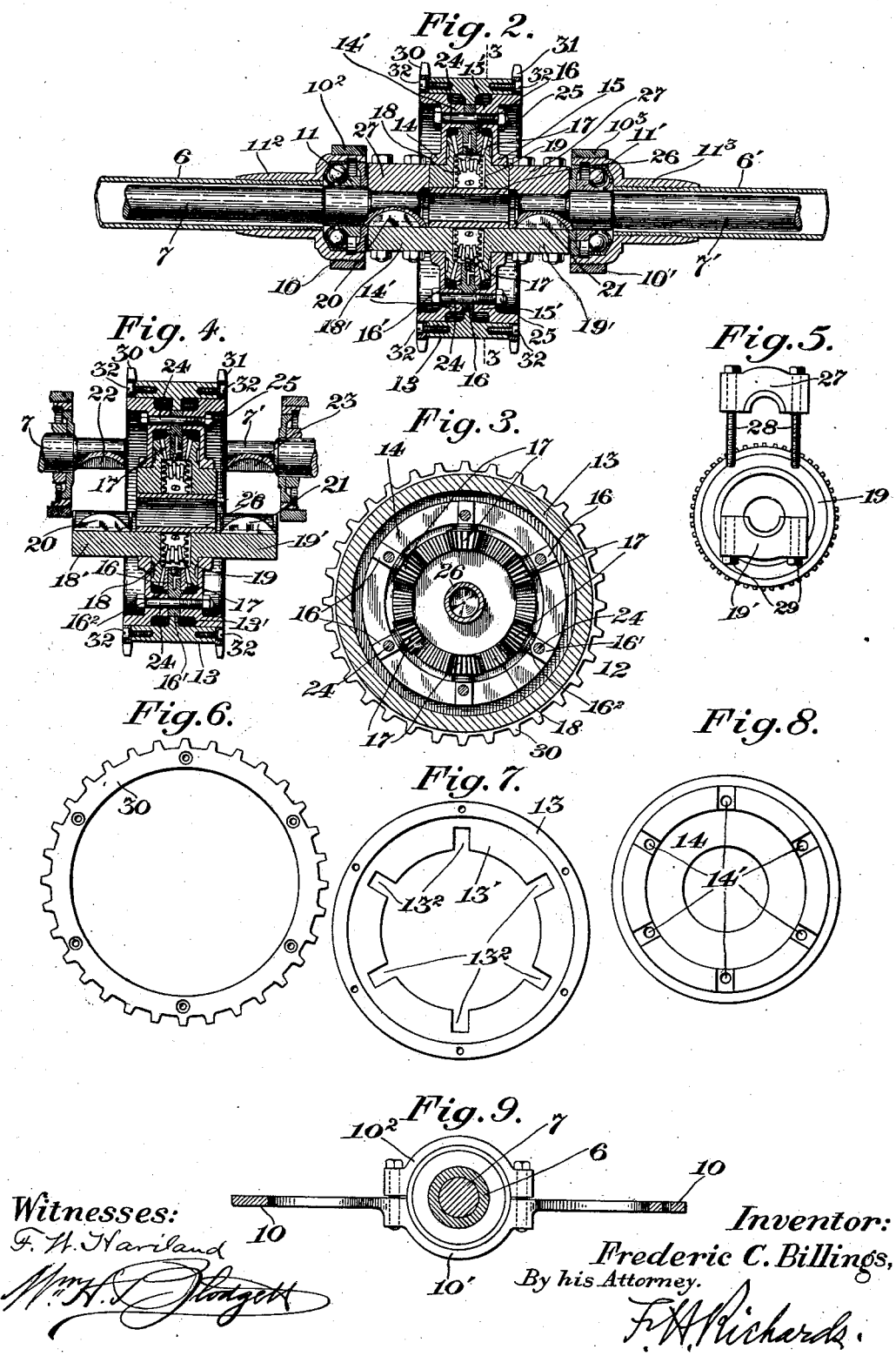
Witnesses:  Inventor:
Frederic C. Billings,
By his Attorney.

UNITED STATES PATENT OFFICE.

FREDERIC C. BILLINGS, OF HARTFORD, CONNECTICUT, ASSIGNOR TO AMERICAN BICYCLE COMPANY, OF NEW YORK, N. Y., AND JERSEY CITY, NEW JERSEY, A CORPORATION OF NEW JERSEY.

COMPENSATING GEAR.

SPECIFICATION forming part of Letters Patent No. 685,321, dated October 29, 1901.

Application filed July 17, 1900. Serial No. 23,860. (No model.)

*To all whom it may concern:*

Be it known that I, FREDERIC C. BILLINGS, a citizen of the United States, residing in Hartford, in the county of Hartford and State of Connecticut, have invented certain new and useful Improvements in Compensating Gear, of which the following is a specification.

In motor-vehicles of many kinds what is known as "differential" or "compensating" gearing is employed for connecting the sections of the driving-axle with the device—a gear, sprocket-wheel, or drum, for instance—to which the power of the motor is applied, whereby in rounding curves, for example, one section of the axle may travel faster than the other section without affecting the speed of the vehicle. Some faults of construction are met with in the old forms of compensating gear, and it is difficult to assemble and disassemble the parts thereof and also readily to apply the gear bodily to and withdraw it from the sectional axle.

My invention has for its object the provision of improved compensating or differential gearing of such construction that it may be readily assembled, and when in this condition may easily be applied to or withdrawn bodily from the axle for inspection or repairs, all as will be hereinafter described.

Referring to the accompanying drawings, Figure 1 is a plan view of the driving-axle and part of the frame of a motor-vehicle, showing my improved compensating gear in place thereon. Fig. 2 is a longitudinal vertical section illustrating the manner in which the compensating gear is applied to the sectional driving-axle. Fig. 3 is a section on line 3 3, Fig. 2. Fig. 4 is a section similar to Fig. 2, showing the compensating gear detached and just dropping from the axle. Fig. 5 is an end view of the gear and its journal-boxes. Fig. 6 is a side elevation of one of the sprocket-rings. Fig. 7 is a side elevation of the peripheral part of the frame of the gear, the sprocket-ring being removed. Fig. 8 is an inner side view of one of the side plates of the gear. Fig. 9 is a section through the yoke connecting the driving-axle sleeves on line $y\,y$, Fig. 1.

Like numerals designate similar parts throughout the several views.

In the drawings, the numeral 5 designates part of the frame of a motor-vehicle; 5' 5², the reaches thereof, and 6 6' the sleeves in which the sections of the rear axle 7 7' are mounted; 8 8', the driving-wheels; 9 9', braces; 9², a curved truss; 10, a yoke attached to the sleeves 6 6', and 11 11' ball-bearings in which the axle rotates, and as thus far described these devices may be of any approved construction.

Designated in a general way by the numeral 12 is a compensating or differential gear, which will now be described. This gear in the construction illustrated has a body composed of a peripheral ring 13, having a short central web 13', slotted at 13², for a purpose hereinafter stated, and two side plates 14 and 15, respectively, having perforated lugs 14' 15', which clasp between them and within slots 13' of ring 13 the perforated shanks 16' of bolts 16, upon the heads 16² of which pinions 17 are loosely mounted, said pinions being in mesh with gears 18 and 19, respectively, from each of which projects one part of a sectional hub 18' 19', respectively, fitted with Woodruff or other suitable keys 20 21, which are adapted to be received in recesses 22 and 23, formed, respectively, in the end portions of the axle-sections 7 7', as seen in Figs. 2 and 4. Passing through the lugs 14' 15' of the side plates 14 and 15 and through the perforated shanks 16' of bolts 16 are bolts 24, fitted with nuts 25 for securing the parts just described together, as shown in Figs. 2 and 4. Resting in the central openings of the bevel-gears 18 and 19 is a sleeve 26, which keeps said gear-wheels in alinement and yet permits of their free and independent rotary movement. Caps or removable parts of the sectional hubs 27 are provided for inclosing the upper surfaces of the end portions of the axle-sections 7 7', and said caps 27 are secured to the integral parts 18' 19' by bolts 28 and nuts 29, as shown in Figs. 1, 2, and 5, thereby firmly uniting the gears 18 and 19 to the axle-sections 7 7'.

Power from the motor may be transmitted to the compensating gear in any desired way, and shown for accomplishing this purpose in the present construction are sprocket-wheels 30 and 31, which are attached by screws 32 to the edges of the ring 13. Any other device or devices may, however, be substituted for these sprocket-wheels without departure from my invention.

As will be observed by reference to Figs. 1 and 2, the compensating gear is received in the space inclosed by the yoke 10, and should it be desired to detach said gear for any purpose the nuts 29 are removed from the bolts 28, and the gear can then be bodily withdrawn, as shown in Fig. 4.

As a convenient means of connecting the yoke 10 to the ball-bearings 11 11', said yoke is formed with half-bearings 10' on its under side, which are threaded for the reception of threaded thimbles $11^2$ $11^3$, which constitute the adjustable portions of the ball-bearings, caps $10^2$ $10^3$, threaded on their under sides, serving to secure the yoke in place. (See Figs. 1, 2, and 9.)

My invention is not limited to the exact devices shown and described, for many of them may be modified and other forms of compensating gear may be applied to the shaft-sections in the same way; nor is it limited to the use of bevel-pinions and gears in the compensating gear, for any suitable kind of pinions and coacting gears may be employed.

Having thus described my invention, what I claim, and desire to secure by Letters Patent, is—

1. The combination with a sectional shaft, of a compensating gear uniting the shaft-sections and detachable clamping means for securing the shaft-sections to the compensating gear whereby said gear may be bodily attached to and removed from said shaft-sections.

2. The combination with a sectional shaft, of a compensating gear having a peripheral ring provided with a slotted web and side plates having lugs, a pinion, a bolt having a shank located in a slot of the web, means for securing the side plates, bolt and peripheral ring together, a pair of oppositely-facing gears, each having a sectional hub, and means for securing the sectional hubs of said gears to the shaft-sections respectively.

3. The combination with shaft-sections having recessed end portions, of a compensating gear composed of a peripheral ring to which power is applied, said ring having a slotted web, and side plates, a series of bolts having shanks fitted in the slots of the web, means for connecting the bolts and side plates, a series of pinions loosely mounted on the heads of the bolts, a pair of oppositely-facing gears, each gear having a sectional hub, and means for securing said gears, and through them the entire compensating gear, to the shaft-sections.

4. The combination with shaft-sections, of a compensating gear composed of a peripheral ring having a slotted web and side plates, each having a series of perforated lugs, bolts having perforated shanks fitted in the slots of the web, connecting-bolts passing through perforations in the lugs of the side plates and the shanks of the bolts, a series of bevel-pinions loosely mounted on the heads of the bolts, a pair of oppositely-facing bevel-gears, and means for connecting said gears, and through them the entire compensating gear, to the shaft-sections.

5. The combination with shaft-sections of a yoke, a compensating gear located within the yoke and having sectional hubs, keys carried by the fixed parts of the sectional hubs and fitting recesses in the end portions of the shaft-sections, and bolts for uniting parts of the sectional hubs and thereby attaching the entire compensating gear to the shaft-sections.

6. The combination with shaft-sections, of a yoke, a compensating gear located within the yoke and having sectional hubs for the reception of the end portions of said shaft-sections, and bolts for detachably uniting the parts of the sectional hubs and thereby connecting the entire compensating gear to the shaft-sections.

7. A compensating gear comprising a peripheral ring to which power is applied, said ring having a short slotted web, side plates fitted within the ring and each having a series of perforated lugs, bevel-pinions secured in place between the side plates, oppositely-disposed bevel-gears, each gear having a sectional hub provided with a key, and means adapted to unite the parts of the sectional hubs and thereby secure the entire gear in position.

8. The combination with shaft-sections, of ball-bearings in which said sections are journaled, a yoke having bearings threaded upon one of the members of each ball-bearing, a compensating gear located within the yoke, and means for bodily attaching said gear to the shaft-sections.

9. The combination with shaft-sections, of ball-bearings in which said sections are journaled, a yoke in which the adjustable members of the ball-bearings are mounted, a compensating gear located within the yoke, and means for detachably connecting said gear to the shaft-sections.

FREDERIC C. BILLINGS.

Witnesses:
D. E. MARCHANT,
H. B. BELFIELD.